(No Model.)
S. D. POOLE.
LISTER CULTIVATOR.
No. 521,547. Patented June 19, 1894.
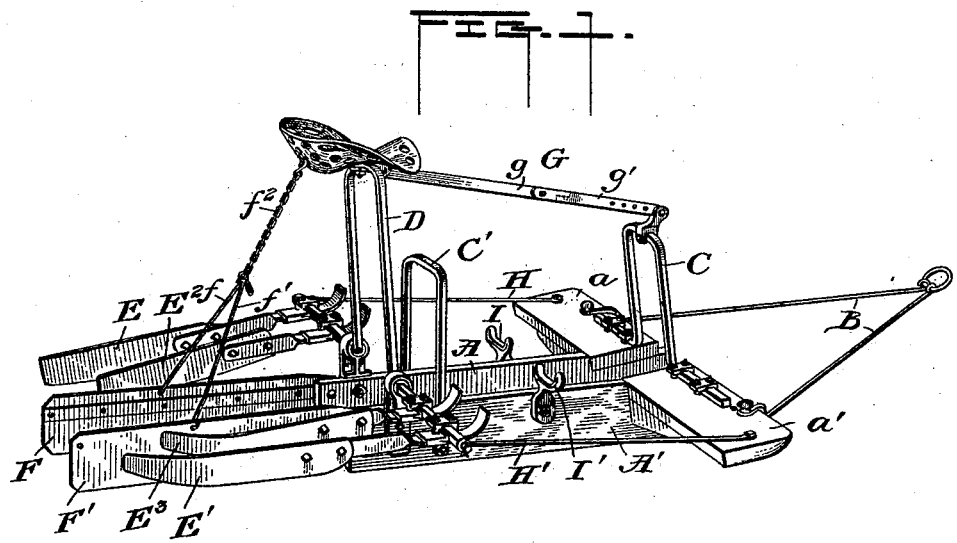
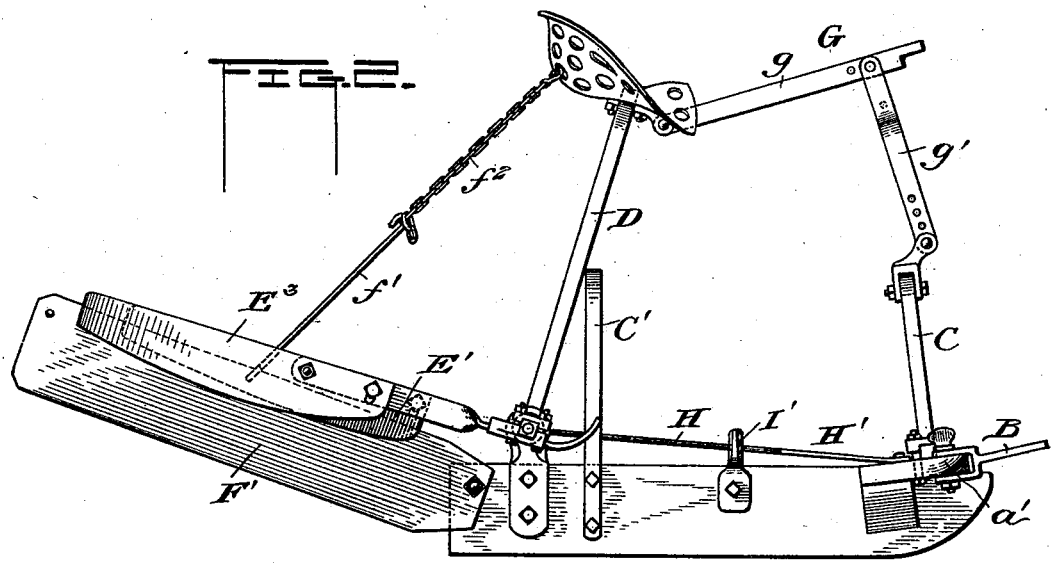
Witnesses
Inventor
Staley D. Poole
By Butterworth & Dowell
his Attorneys.

UNITED STATES PATENT OFFICE.

STALEY D. POOLE, OF MOLINE, ILLINOIS, ASSIGNOR TO THE DEERE & COMPANY, OF SAME PLACE.

LISTER-CULTIVATOR.

SPECIFICATION forming part of Letters Patent No. 521,547, dated June 19, 1894.

Application filed January 20, 1894. Serial No. 497,554. (No model.)

*To all whom it may concern:*

Be it known that I, STALEY D. POOLE, a citizen of the United States, residing at Moline, in the county of Rock Island and State of Illinois, have invented certain new and useful Improvements in Lister-Cultivators; and I do hereby declare the following to be a full, clear, and exact description of the invention, such as will enable others skilled in the art to which it appertains to make and use the same.

This invention relates to improvements in cultivators, but more particularly to lister cultivators, or machines for cultivating listed corn.

The primary object of the invention is to provide a simple and efficient machine especially designed for cultivating listed corn, and adapted to prevent the young plants from being covered by the dirt which is thrown toward the same by the cultivator blades running on opposite sides of the plants in the furrows and below the surface of the ground, and also to prevent injury to the corn in turning corners or at the ends of the rows.

The invention will first be described with reference to the accompanying drawings, which form a part of this specification, and then particularly pointed out in the claims at the end of the description.

Referring to the drawings, Figure 1 represents a perspective view of a lister cultivator embodying my invention, and Fig. 2 a side elevation of the same showing the shields or fenders and cultivator blades in an elevated position for turning corners; the driver's seat being thrown forward on its supporting arch.

A, A', may denote a pair of sleds or runners provided at their forward ends with laterally projecting wings or leveling boards $a$, $a'$, to which the draft rods B, are connected. Secured upon the wings or boards $a$, $a'$, is an arched connecting bar C, and near their rear ends the runners may be similarly connected by an arched bar C'. In suitable bearings mounted upon the rear ends of the runners, preferably slightly in rear of the arch C', are fitted or journaled the laterally projecting horizontal arms of a rocking bar or arched seat-supporting bar D, to the lateral arms of which are adjustably secured the spring blades E, E', $E^2$, $E^3$. I preferably provide a pair of these blades at either side of the runners, but in some cases, if desired, either the outer or the inner blade of each pair may be omitted. These blades are preferably formed with inwardly curved rear portions adapted to throw the soil toward the row of plants; and at either side of the row, between the same and the inner blade is placed a vertically disposed guard plate or fender F, or F'; the said fenders being pivoted at their front ends to the rear ends of the runners A, A' respectively. The fenders or shields F, F', are flexibly connected by means of the rods $f$, $f'$, and chain $f^2$, or other suitable connection, with the upper portion of the arch D, or the seat supported thereon, so as to cause the rear ends of the shields to be raised when said seat is thrown forward in the manner indicated in Fig. 2.

The blades E, E', $E^2$, $E^3$, are preferably constructed of spring metal and may be either rigidly secured to the lateral arms of the yoke or arch D, or adjustably secured thereto, as shown, so as to permit a lateral adjustment thereof for the purpose of varying the distance between the blades and their proximity to the rows of corn, and correspondingly varying the capacity of the blades to throw the soil onto the corn. The arms of the yokes or arches C, C', D, are also preferably adjustably secured so as to permit the distance between the runners to be varied, or the yoke C', may be omitted if desired, though for the purpose of giving strength and rigidity to the structure, a rigid yoke C', as shown, is preferably employed.

G, denotes a jointed bar or rod extending from the seat-supporting arch D, to the arch C, and pivotally secured to said arches at its ends. This bar is preferably constructed in two parts $g$, $g'$, which are pivotally connected by a rule-joint or similar connection which permits the bar to flex or yield when lifted, but holds the same rigidly against lineal or downward pressure, so that when the parts are in the position shown in Fig. 1, with the driver in his seat, the spring blades will be held down to their work, but when it is desired to elevate the blades and shields for any purpose, for instance, in turning corners, or to pass an obstruction, the operator may lift section g, of the jointed connecting bar, and at the same time throw his weight forward, thereby elevating the blades and shields to the position shown in Fig. 2. Having passed the obstruction or turned the corner, as the case may be, the operator, by releasing the jointed bar and throwing the seat backward with his weight thereon, may lower the parts to working position, in which position they will be held by the bar G, with its rule-joint locked against the pressure exerted by any forward thrust upon the bar, and until the same is lifted in the manner already explained.

The outer ends of the horizontal arms of the arch D, may be braced by rods H, H', extending therefrom to the outer ends of the leveling boards a, a'. Foot-rests I, I, may also be provided, if desired, on which the operator may place his feet while the machine is in use.

In operation, as the cultivator is drawn along the ground, (the draft animals being made to walk on the ridges,) the leveling boards will pass along the tops of the ridges, leveling and smoothing the same, while the fenders pass along one at either side of the row of plants and the blades will cut the weeds and grass and gently turn the soil toward the plants which will be protected against clods and too great a quantity of earth tending to fall thereon, by the interposed shields; the blades, however, by reason of their inturned rear ends, throwing the fine dirt or soil against the shields or fenders in such quantity that after the shields have passed the dirt will fall around the roots of the plants without covering the same.

Having thus fully described my invention, what I claim as new, and desire to secure by Letters Patent of the United States, is—

1. In a cultivator, the combination with the runners, of the arched bar connecting the forward portions thereof, and the arched seat-supporting bar connecting their rear portions and carrying a seat thereon, together with the cultivating blades secured to the lateral arms of said seat-supporting arch, so that their rear ends may be elevated or depressed when said bar is rocked in its bearings by the weight of the driver while on the seat, substantially as described.

2. In a cultivator, the combination with the runners, of the arched bar connecting the forward portions thereof, and the arched seat-supporting bar connecting their rear portions, together with the cultivating blades secured to the lateral arms of said seat-supporting arch, so that their rear ends may be elevated or depressed when said bar is rocked in its bearings, and a jointed rod or bar connecting the front and rear arches, substantially as described.

3. A cultivator comprising the runners having the shields hinged thereto, the arched seat-supporting bar mounted thereon, the blades projecting rearwardly from the horizontal arms of said bar, the flexible connection between said arched bar and shields, the arch connecting the forward portions of said runners, and the jointed bar connecting said arches, substantially as described.

4. In combination with the runners having the shields hinged to the rear ends thereof, the arched seat-supporting bar journaled in bearings mounted on said runners and having the spring-blades secured to the lateral arms thereof, a flexible connection between said shields and said seat-supporting arch, an arched bar connecting the front portions of said runners, and a bar extending between and pivotally connecting the two arches and provided with a rule-joint, whereby the blades may be held to their work or elevated by the weight of the driver when thrown forward in his seat, substantially as described.

5. A cultivator comprising the runners provided with laterally extending wings or leveling boards having the draft devices secured thereto, the arched bar connecting said wings, the arched seat-supporting rocking bar connecting the rear portions of the runners and provided with rearwardly projecting blades adapted to be elevated or depressed when said bar is rocked, and the rule-jointed bar extending between the arches and pivotally connected thereto, substantially as described.

6. In combination with the runners, and the arches connecting the same; one of said arches being journaled upon said runners and having a seat mounted thereon, a jointed rod or bar pivotally connecting said arches and adapted to flex when lifted, and the rearwardly projecting blades secured to said seat-supporting bar, substantially as described.

7. In combination with the runners and the arched seat-supporting bar journaled thereon, the rearwardly projecting cultivating blades secured to the rocking arms of said bar, and means for normally locking the seat in its rearward position against forward movement, but adapted to permit such movement when desired, substantially as described.

In testimony whereof I affix my signature in presence of two witnesses.

STALEY D. POOLE.

Witnesses:
WM. BUTTERWORTH,
A. R. EBI.